:::
United States Patent [19]

Hobbs

[11] 3,833,309

[45] Sept. 3, 1974

[54] BALL JOINT

[75] Inventor: Ronald Henry Hobbs, Halstead, England

[73] Assignee: Cam Gears Limited, Hitchin, England

[22] Filed: Jan. 8, 1973

[21] Appl. No.: 321,829

[30] Foreign Application Priority Data
Jan. 11, 1972  Great Britain...................... 1238/72

[52] U.S. Cl. .............................................. 403/122
[51] Int. Cl. .............................................. F16c 11/06
[58] Field of Search ............ 403/122, 124, 125, 126, 403/127, 129, 130, 131, 132, 133, 135; 29/149.5 B

[56] References Cited
UNITED STATES PATENTS

| | | | |
|---|---|---|---|
| 2,876,029 | 3/1959 | Latzen .................. | 403/133 |
| 3,063,744 | 11/1962 | Flumerfelt .......................... | 403/133 |
| 3,391,955 | 7/1968 | Gottschald .......................... | 403/131 |
| 3,455,585 | 7/1969 | Raymond ............................ | 403/122 |
| 3,679,248 | 7/1972 | Herbenar ........................ | 29/149.5 B |

FOREIGN PATENTS OR APPLICATIONS

| | | | |
|---|---|---|---|
| 1,953,396 | 4/1971 | Germany ............................ | 403/133 |

*Primary Examiner*—Werner H. Schroeder
*Attorney, Agent, or Firm*—Hill, Gross, Simpson, Van Santen, Steadman, Chiara & Simpson

[57] ABSTRACT

A ball and socket joint useful in vehicle steering assemblies composed of a metal ball stud, a metal stem with an eye end, a main open-ended plastic socket molded around the eye end of the stem defining a ball socket surrounded by the eye and receiving the shank of the ball stud through one end thereof. The other end of this plastic socket is closed by a plastic cup pressed into the socket against the ball head to preload the head against the bearing wall of the main plastic part and secured to this part by fusion, cementing or the like. The ball end of the stud is thus surrounded by a synthetic plastic bearing which in turn embraces the end of a stem extending laterally from the bearing. The ball and socket components of the joint are in preloaded relation, and articulate relative to each other in a smooth manner without accommodating shifting of the ball stud either laterally or axially from its fixed tilting center.

7 Claims, 1 Drawing Figure

PATENTED SEP 3 1974  3,833,309
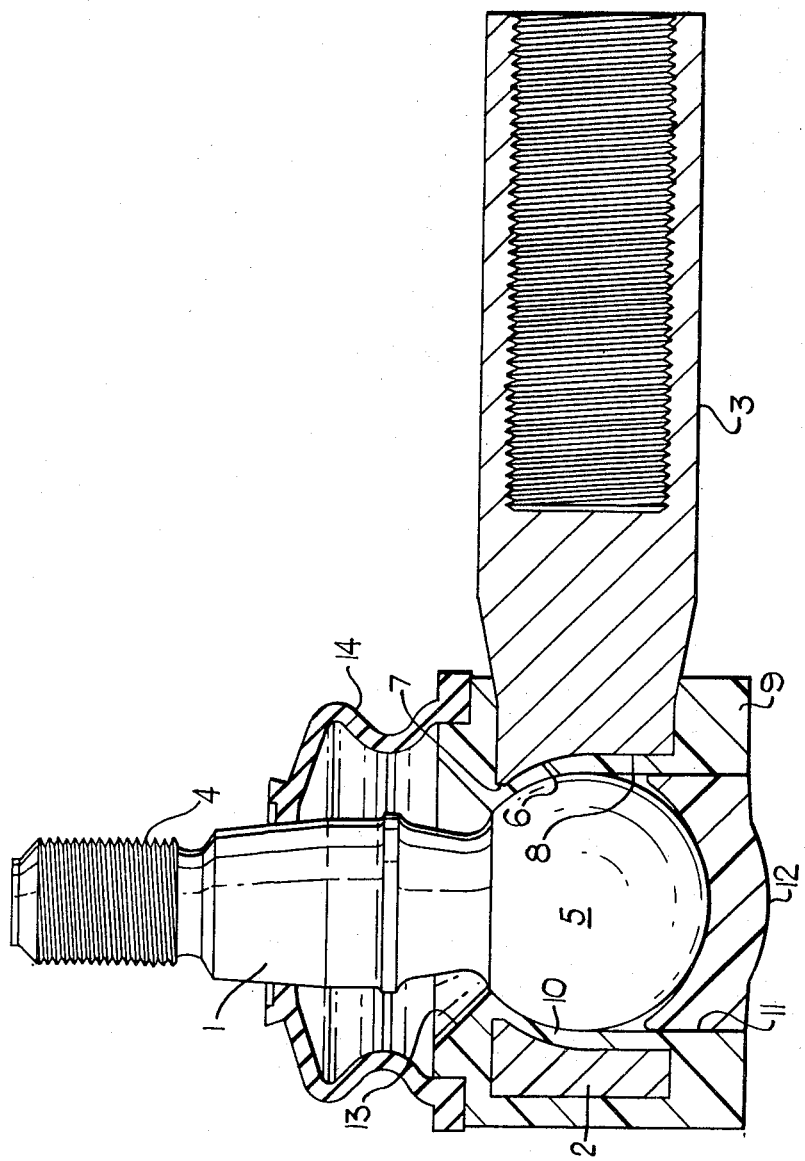

BALL JOINT

FIELD OF THE INVENTION

This invention relates to the art of pin or stud joints having plastic bearings or sockets and particularly deals with ball and socket joints for automotive steering linkages and the like.

DESCRIPTION OF THE PRIOR ART

Ball and socket joints with molded synthetic plastics bearing sockets are known in the art, for example, in British Pat. No. 1,121,004, published July 24, 1968. The joints of this patent have a one-piece synthetic plastics bearing socket molded around the major part of the ball head of the stud and into keyed interengagement with a housing. The construction of such joints involve a manufacturing process in which the actual ball head of the joint had to be utilized as a "plug" or "core" when molding the socket onto the housing. Such a manufacturing process prevents preloading of the ball and socket components to a standard level for regulating torque, wear take-up capacity, and the like desired features for avoiding looseness and shifting of tilting and turning centers for the components. Further, the manufacturing process was slow and costly.

SUMMARY OF THE INVENTION

According to the present invention, the deficiencies of one-piece molded plastics bearing sockets are avoided and preloaded pin or stud joints are provided with two-part sockets in an economical manner especially suited for mass production of preloaded joints.

In a preferred embodiment of the invention, synthetic plastics material such as nylon or acetyl resin, preferably filled with an anti-friction material such as molybdenum disulfide, is molded around the eye end of a metal stem to define in the eye an open-ended chamber having a fragmental spherical bearing wall supporting the ball end of a ball stud and converging to a small diameter opening receiving the shank of the ball stud freely therethrough and with a cylindrical portion extending from the bearing wall to a large diameter opening which is closed by a plastics plug pressed into the cylindrical portion against the ball end of the stud and having a partial spherical recess receiving said ball end in tiltable relation. The small open end of the socket has a diverging mouth surrounded by a circular recess which mounts the lower end of a boot seal engaging the shank of the ball stud in sealed relation.

It is then an object of this invention to provide an improvement on the ball joint of British Pat. No. 1,121,004 wherein the synthetic plastics bearing socket is composed of two components and avoids the requirement for the ball end of the ball stud to serve as a core for molding the socket.

Another object of the invention is to provide a ball joint with a molded synthetic plastics material socket integrated from two components to preload the ball stud.

Another object of the invention is to provide a ball and socket joint with a molded plastics socket embracing the eye end of the metal stem and having a plastics closure plug fused thereto to preload the ball end of the ball stud in the socket.

Another object of the invention is to provide pin joints with molded plastics having plastic closure caps integrally bonded with the socket defining plastics component.

Another object of the invention is to simplify the manufacture of ball and socket joints with plastics sockets by providing the plastics socket in two components cooperating to preload the ball member in the socket.

Other and further objects of this invention will become apparent to those skilled in this art from the following detailed description of the annexed sheet of drawings which, by way of a preferred example only, illustrates one embodiment of the invention.

ON THE DRAWING

The single FIGURE of the drawing is a longitudinal cross sectional view of a ball and socket joint according to this invention with the ball stud shown in elevation.

AS SHOWN ON THE DRAWING

The joint shown on the drawing has a ball pin or stud with a shank 1 having an outer, externally screw-threaded extremity 4 at one end thereof and an integral ball head 5 at the other end thereof. This ball pin or stud is assembled within an open-ended ring or eye constituting the housing 2 at the end of a steering rod or stem or similar part 3 which extends laterally and is internally threaded to receive another link part.

The housing 2 has an internal dome-shaped configuration 6 of greater diameter than that of the ball head 5. It also has an open top 7, which is preferably slightly less in diameter than the ball head 5, and a generally cylindrical bottom bore 8.

Between the ball 5 and the inner wall 6 of the housing 2, there is interposed a main part 9 of a bearing socket. This part is molded in and around the housing 2 before assembly of the ball joint. It has a generally dome-shaped internal configuration at 10, to form the main bearing surface for the ball 5. The bottom bore 11 of the socket which lies within the lower bore 8 of the housing is cylindrical to receive a preformed closure plug 12.

The socket mouth 13 is flared in a customary manner from the ball head.

The socket parts 9 and 12 are preferably formed by injection molding from synthetic plastics material such as nylon or acetyl resin with a filling of anti-frictional material, for example, molybdenum disulfide.

When molding the main socket part 9, the housing is located in a mold with a suitably shaped plug in the position to be occupied by the ball 5. The closure cap 12 may be formed of the same plastics material in another mold.

To assemble the ball joint, the ball pin is first located in the main part of the socket. The cap 12 is then located in the bore 11, preferably under pressure sufficient to preload the ball head against the bearing part 10 to a specified rotating or oscillating torque. The cap is then secured to the main part 9, for example, by a high-frequency induction welding process to fuse the two plastic parts together.

A flexible dust excluding sleeve or boot 14 of known form is located about the shank 1 and is bottomed on the socket part 9.

It will thus be seen that the molded plastics part 9 has its bearing portion 10 of fragmental spherical shape surrounded or backed by the dome-shaped configuration 6 of the metal housing 2 on the end of the stem 3 so that the ball socket for the stud is reinforced against deformation. It will also be noted that the plug 12 has a recess embracing the bottom end of the ball 5 and that a pressing of the plug into the bore 11 with a controlled force will preload the ball end 5 in the socket exactly as desired. When the socket parts 9 and 12 are integrated as by fusing, cementing or the like, the ball end 5 is encased in plastics material and this plastics material is reinforced by metal so that tensile and lateral loads on the stud, such as occur in automotive steering linkages and the like will not cause shifting of the ball 5 from its predetermined tilting and rotating center.

It will be appreciated that the particular construction of the illustrated embodiment does not limit this invention to the details described and that variations within the scope of the claims will be apparent to those skilled in this art.

I claim as my invention:

1. A stud and socket joint which comprises:
a metal member having an eye end,
a molded plastics socket part embracing said eye end and defining an open-ended socket within said eye end,
a stud member having an end in said socket and a stem projecting therefrom through one open end of the socket,
a plastics closure plug in the other open end of the socket pressed against said end of the stud to preload the stud in the socket, and
said plug being integrally secured to the plastics socket material to maintain said preload.

2. The joint of claim 1, wherein the stud member has a ball end and the plastics socket and plug are configured to embrace said ball end.

3. The joint of claim 2, wherein the eye end has a cylindrical bore at one end and a fragmental spherical inwardly converging wall at the other end reinforcing the bearing wall of the plastics socket.

4. A ball and socket joint which comprises:
a metal stem having an eye end,
a synthetic plastics part molded around and through said eye end defining an open-ended socket in said eye end with a fragmental spherical bearing wall converging to a small diameter opening at one end and a cylindrical wall extending to a large diameter opening at the other end,
a ball stud having a ball end seated on the spherical portion of the plastics socket and a shank extending through the small end of the socket,
a plastics plug pressed into the large end of the socket against the ball end of the stud therein, and means integrating the plug with the socket to maintain a preload on the ball end established by the pressing of the plug into the socket.

5. The ball and socket joint of claim 4, wherein the internal periphery of the eye end of the stem has the same configuration as the internal socket wall of the plastic part molded around the eye end.

6. The ball and socket joint of claim 4, wherein the plastics part has a peripheral recess for booming a boot seal.

7. The ball and socket joint of claim 4, wherein the plastics part has a mouth diverging from the small open end thereof to accommodate tilting of the ball stud.

* * * * *